Oct. 11, 1949.  W. S. BURDICK ET AL  2,484,685
VENTILATED EXCAVATOR CAB
Filed April 19, 1945  3 Sheets-Sheet 1
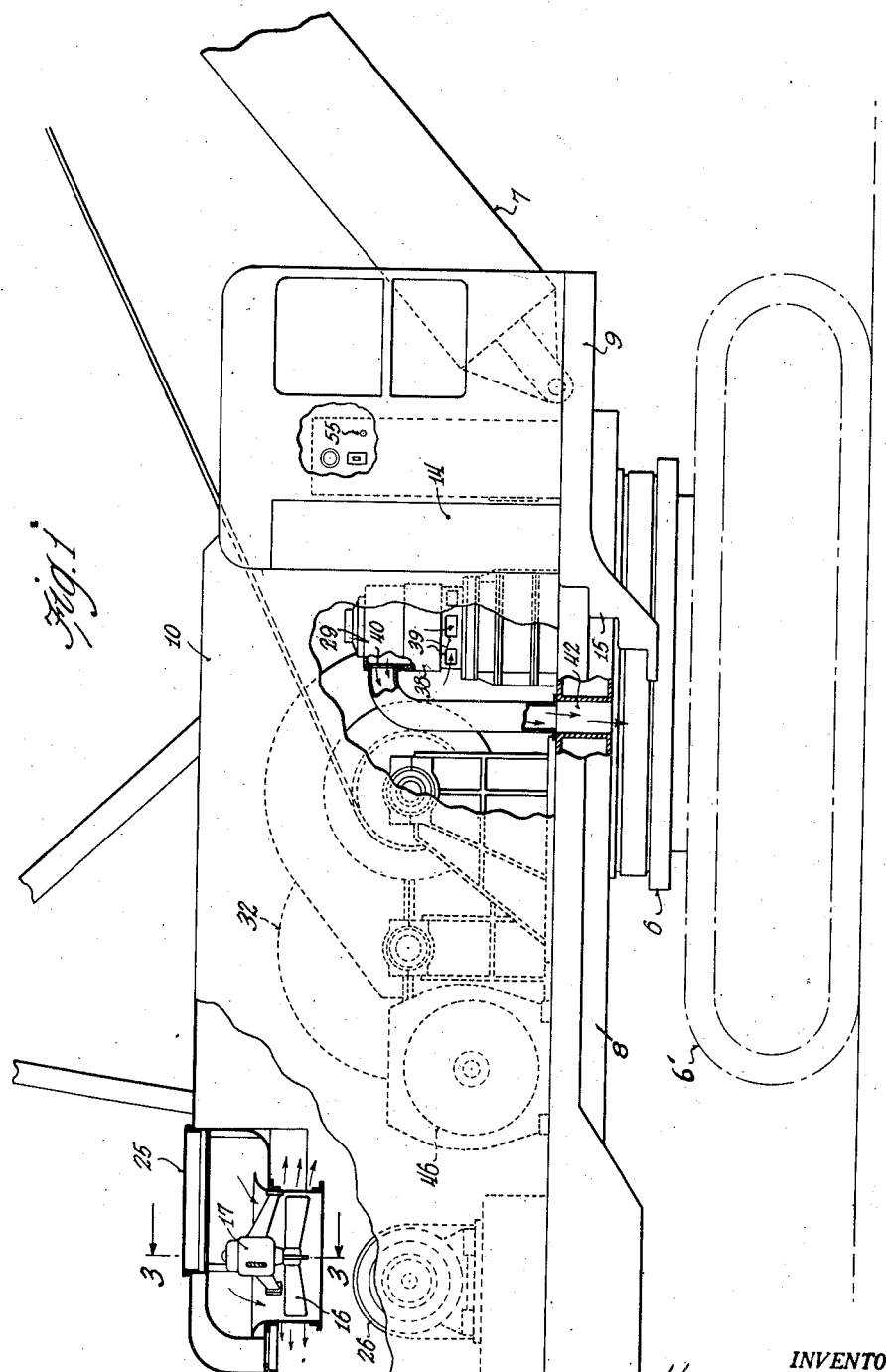
INVENTOR.
Henry S. Jacobs
BY Will S. Burdick
David A. Fox
ATTORNEY.

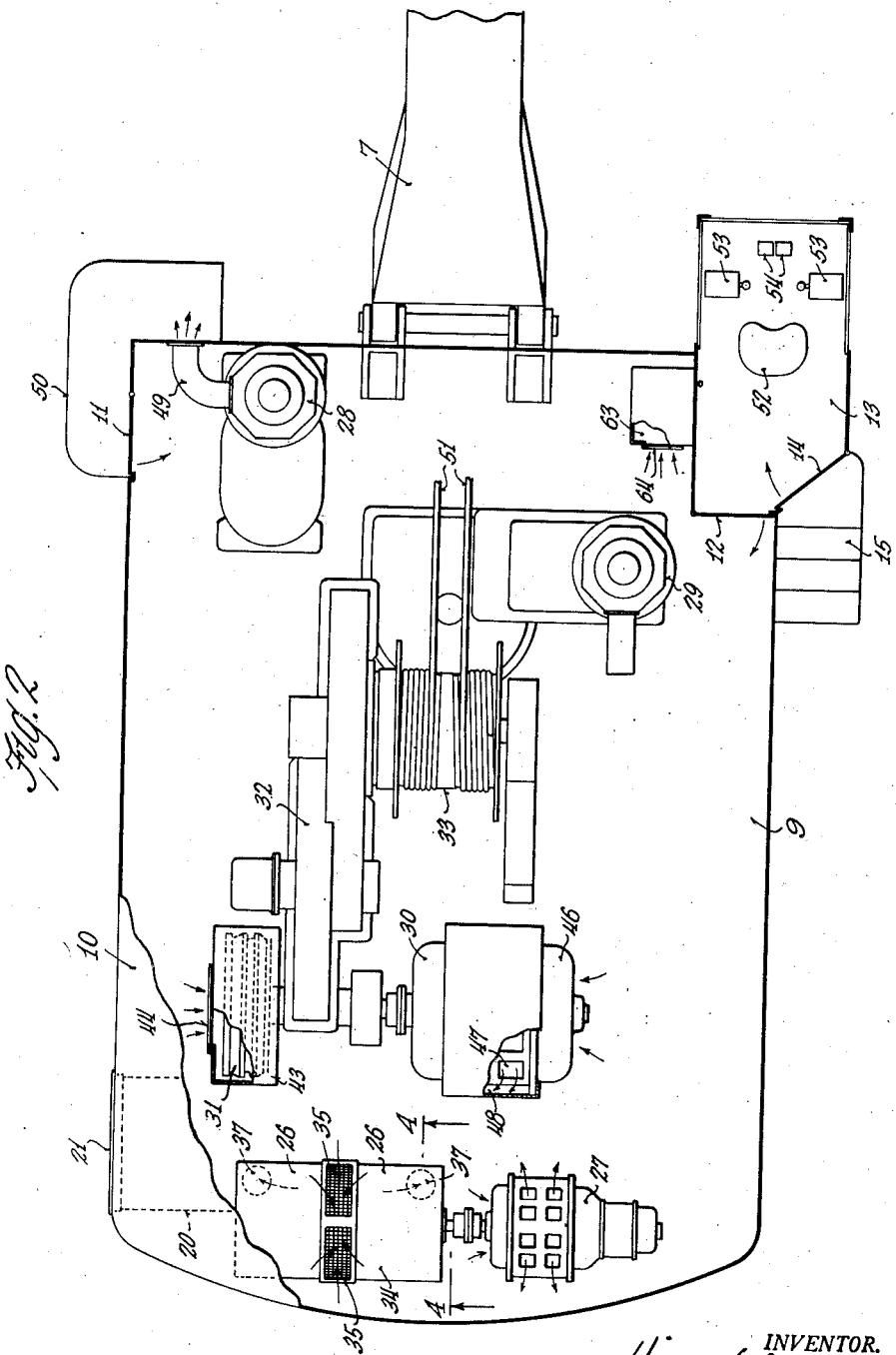

Oct. 11, 1949.  W. S. BURDICK ET AL  2,484,685
VENTILATED EXCAVATOR CAB
Filed April 19, 1945  3 Sheets-Sheet 3
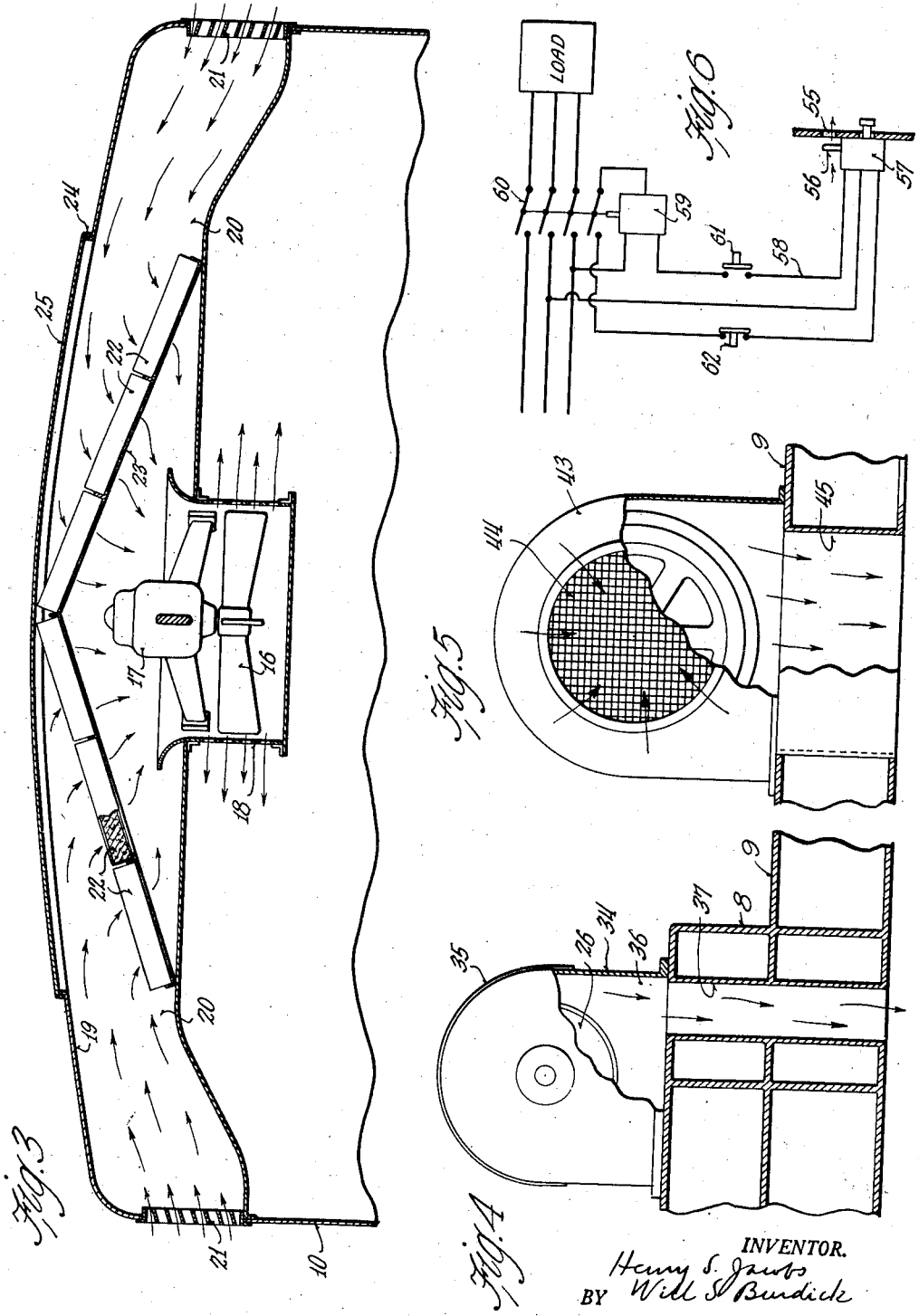

Patented Oct. 11, 1949

2,484,685

UNITED STATES PATENT OFFICE 2,484,685

VENTILATED EXCAVATOR CAB

Will S. Burdick, Wauwatosa, and Henry S. Jacobs, Milwaukee, Wis., assignors to Harnischfeger Corporation, Milwaukee, Wis., a corporation of Wisconsin Application April 19, 1945, Serial No. 589,188

3 Claims. (Cl. 98—33)

The invention relates to power operated excavators and more particularly to the heat dissipating arrangements for the cab mounted power units thereof and resides more particularly in a form of such apparatus in which a continually renewed atmosphere of filtered air under pressure is maintained within said cab by forcing means while continually permitting the same to escape after first passing over heat dissipating surfaces of electrical or other power units contained within the cab and requiring cooling.

Excavators are usually provided with cabs or enclosures for protecting the machinery from the weather. In hot weather the sun beating down on the cab of the ordinary excavating machine may raise the temperature of the air within the cab to a point where the operating temperatures of power units such as electric motors and the like becomes so high that there is danger of deterioration of the windings, particularly where the overload capacity of such power units may be small. Furthermore, excavators have to work in locations where a large amount of dust and abrasive matter is brought into suspension in the air which if given free access to the cab may cause damage to operating parts contained therein. The object of this invention is to provide an apparatus which permits a filtered air supply to be forced through the cab to escape channels containing instrumentalities to be cooled, at such a rate that the temperature rise within the cab due to sun load will be held within moderate limits and a pressure substantially in excess of outside pressure will be maintained, so that all air movement through accidental as well as intended unfiltered openings in the cab will be outwardly thus precluding the entrance of dust laden unfiltered air.

A further object of the invention is to provide an excavator having a cab containing moving air under pressure and in which, in case the system fails to operate, the source of electrical energy for operating the electrical units within the cab will be shut off.

The invention further consists in the several features hereinafter set forth and more particularly defined by claims at the conclusion hereof.

In the drawings:

Fig. 1 is a side elevation view of an excavator embodying the invention, parts being broken away and parts being shown in section;

Fig. 2 is a plan view of the excavator, parts being broken away and parts being shown as a floor plan of the cab;

Fig. 3 is a detailed vertical sectional view taken on the line 3—3 of Fig. 1;

Fig. 4 is a detailed vertical sectional view taken on the broken line 4—4 of Fig. 1;

Fig. 5 is an end elevation view of the clutch, parts being broken away and parts being shown in section;

Fig. 6 is a diagrammatic view of other protective means for the main circuit supply wiring and control.

Referring to the drawings, the excavator includes a traveling base 6 supported on endless propelling treads 6' suitably driven from the rotating base 8 which has the boom 7 pivotally supported therefrom at one end. The base 8 is mounted in known manner to swing or rotate on the base 6 so as to position the boom 7 in the desired working position.

The platform 9 of the base 8 has the excavator operating units mounted thereon and is enclosed by a cab 10 which is provided with pressure sealed inwardly opening doors 11 and 12, the door 12 providing access to the operator's compartment 13 which has an inwardly opening door 14 and exterior steps 15 leading thereto. The space housing the operating units is completely enclosed by the cab, so that the air therein may be maintained under a pressure somewhat above atmospheric pressure and air is supplied thereto by a forcing fan 16 driven by an electric motor 17 and located in an apertured conduit 18 mounted adjacent the roof 19 of the cab at its back end and supplied with air through a transversely disposed inlet conduit 20 having louvered entrances 21 at each side of the cab and having air filtering units 22 therein mounted on a suitable framework 23 and accessible for installation and removal through a top opening 24 normally closed by a removable cover 25.

The operating units may include a pair of generators 26, a drive electric motor 27 therefor, a swing motor 28, a propelling motor 29, a hoist motor 30 operatively connected through an eddy current clutch mechanism 31 and gearing 32 with a hoist drum 33.

For cooling the generators 26, their housing 34 is provided with air inlets 35, and the exhaust from each end 36 of this housing connects with an outlet or discharge conduit 37 extending to the exterior through the rotatable base 8. The swing and propel motors are similarly cooled, and as shown in detail in Fig. 1, the housing 38 of the propel motor has air inlets 39 and an exhaust opening 40 connected by a conduit 41 to a passage 42 extending to the interior through the base 8.

The housing 43 for the eddy current clutch mechanism 31 is provided with an apertured inlet 44 and an exhaust through a discharge conduit 45 extending to the exterior through the base 8. The housing 46 for the hoist motor 30 has an axial air inlet similar to the inlet 44 and exhausts through peripheral openings 47 into a casing 48 similar to the housing 43 that has a discharge (not shown) through the base 8 similar to the discharge 45. This same method of cooling the motor 30 may be used in conjunction with the drive motor 27, but it has been found that with the forced cooling herein described one or more of the power units may be cooled in conventional fashion by recirculation of the ambient air without danger of overheating of such unit, particularly since such ambient air is subject to continuous positive renewal. It is also to be noted that in connection with the swing motor 28 the exhaust conduit 49 therefrom similar to the conduit 41 of the propell motor, discharges through an opening in the side wall of the cab directly to atmosphere adjacent a small operator's platform 50. The several units are thus provided with forced flow cooling by a continually renewed stream of cooling air.

The hoisting cables 51 pass up through openings (not shown) in the roof of the cab and out to appropriate connections with the gear on the boom. Where the cable passes through these openings, boots or slides may be used or open slots of no greater magnitude than is required for the proper reaving and movement of the cable can be used since the fan 16 may be designed to have a capacity sufficient to allow for a certain amount of air leakage through these slots without loss of the desired pressure within the cab.

The operator's compartment 13 contains the operator's seat 52, the electric hand controls 53, and the foot controls 54. Since door 12 is normally kept closed and a certain amount of air leaks through the various openings provided such as for the foot controls, the pressure within compartment 13 is at substantially atmospheric pressure, and compartment 13 is connected to the relatively higher pressure cab enclosure 10 by a small passage 55 which is located adjacent the thermal responsive element 56 of a thermal overload switch 57 that is included in the relay circuit 58 for the relay 59 controlling the main load switch 60. Thermo-responsive element 56 is of well known type containing a heating coil, so that failure of the forced air stream passing through opening 55 will permit temperature to rise in element 56 to the tripping point even though a low ambient temperature is prevailing. The relay circuit also includes the manually controlled start and stop push buttons 61 and 62. The thermal overload cut out switch 57 with its thermal sensitive element 56 is located in a position so that it will respond to the temperature of the air in the cab 10 and the rate at which such air escapes through opening 55. Thus if for any reason insufficient air is being supplied to the cab to maintain rapid flow through opening 55 and consequently through the other escape channels, so that sufficient cooling for the proper operation of the units within the cab is not provided, the switch mechanism 57 operates to cut out the relay circuit 58 and cause the opening of the main switch 60 to stop the entire operation of the machine until the difficulty with the air supply system can be remedied.

It will be noted that this switch mechanism is housed within a compartment 63 having an apertured inlet 64 and discharging through the small outlet 55 into the operator's compartment 13 which as noted has outlet openings, so that there is a constant circulation of air from the cab past the thermal responsive element 56.

With the above arrangement the filtering elements remove the dust and dirt from the air furnished to the cab interior and thus prevent this foreign matter from getting into the bearings of the operating units and at the same time the forced circulation of air through the cab and its directional flow through parts of the operating units acts to carry off heat generated by these units and keep them at an efficient operating temperature, thus increasing the over all life of the machine and over all efficiency of the operating units.

We desire it to be understood that this invention is not to be limited to any particular form or arrangement of parts except in so far as such limitations are included in the claims.

What we claim as our invention is:

1. In an excavator having a cab enclosing its motive power operating units, an inlet opening through the wall of said cab, a filter interposed in said inlet opening, a fan disposed in said inlet opening adapted to draw air in through said inlet opening and to cause said air to flow through said filter and to discharge said filtered air within said cab against a pressure in excess of atmospheric pressure, housings for said operating units surrounding the same and having inlet openings within said cab and escape passages extending to the exterior of said cab forming with said operating units cooling channels through which forced cooling streams of air are caused to pass in heat removing relationship to said operating units while escaping with a drop in pressure from said cab when said fan is operating, said cab being substantially closed save for incidental openings and save for said filtered inlet opening and said flow resisting escape passages whereby an infiltration-precluding positive pressure is maintained within said cab when said fan is operating.

2. In an electrically operated excavator having a cab enclosing its electric power operating units, an inlet opening through the wall of said cab, a filter in said inlet opening, an electrically driven fan adapted to draw air into said inlet opening and to discharge said air within said cab while passing through said filter, housings for said electric power units surrounding the same and having inlet openings within said cab and escape passages extending to the exterior of said cab forming with said electric power units cooling channels through which forced streams of cooling air are caused to pass in heat removing relationship to said electric power units in escaping from said cab when said fan is operating, said cab being substantially closed save for incidental openings and save for said inlet opening and said escape passages whereby an infiltration-precluding positive pressure is maintained within said cab when said fan is operating, a power supply for said electric power units, power supply maintaining means adapted to maintain the same while positive pressure prevails within said cab and adapted to interrupt said supply upon failure of said pressure.

3. In an electrically operated excavator having a cab enclosing its electric power operating units, an inlet opening through the wall of said cab, an electrically driven fan adapted to draw air into said inlet opening and to discharge said air within said cab, said inlet opening including means adapted to cause the stream of air delivered to said fan to be comparatively free of dust, housings for said electric power units surrounding the same and having inlet openings within said cab forming with said electric power units cooling channels through which forced streams of cooling air are caused to pass in heat removing relationship to said electric power units in escaping from said cab when said fan is operating, said cab being substantially closed save for incidental openings and save for said inlet opening and said escape passages whereby an infiltration-precluding positive pressure is maintained within said cab when said fan is operating, a power circuit for said electric power units, a control escape opening in a wall of said cab through which a control stream of cooling air may escape under the impetus of pressure prevailing in said cab, a temperature responsive circuit maintaining instrumentality positioned to be impinged by said control stream and adapted to open said power circuit upon attaining a predetermined temperature in excess of normal operating temperature, and heating means in heat transmitting relationship to said circuit maintaining instrumentality adapted to cause the same to be heated to a temperature exceeding said predetermined temperature only upon failure of said control stream to normally cool the same.

WILL S. BURDICK.
HENRY S. JACOBS.

REFERENCES CITED

The following references are of record in the file of this patent:

UNITED STATES PATENTS

| Number | Name | Date |
|---|---|---|
| 1,315,996 | Simmon | Sept. 16, 1919 |
| 1,751,686 | Duerk | Mar. 25, 1930 |
| 1,796,198 | Gehnrich | Mar. 10, 1931 |
| 1,859,797 | Ready | May 24, 1932 |
| 1,898,859 | Thorp | Feb. 21, 1933 |
| 1,987,456 | Woodard | Jan. 8, 1935 |
| 2,203,477 | Wahlberg | June 4, 1940 |
| 2,289,910 | Hanson | July 14, 1942 |
| 2,292,192 | Bergstrom | Aug. 4, 1942 |
| 2,300,418 | Hall | Nov. 3, 1942 |